June 25, 1968 K. A. BRANDENBERG 3,389,720
NOT VALVE FOR FLUID LOGIC CIRCUITS
Filed June 28, 1966
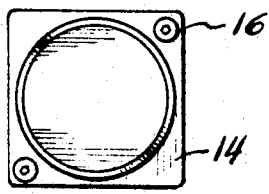
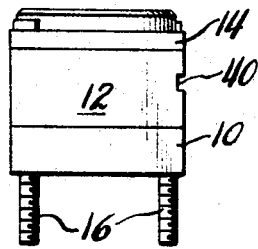
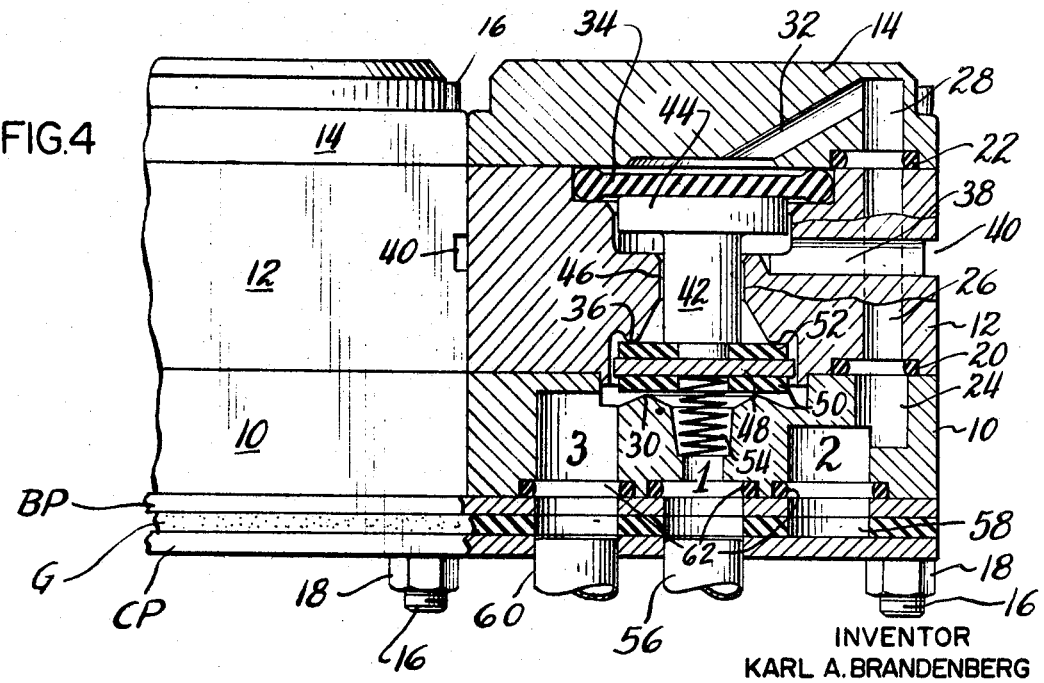
INVENTOR
KARL A. BRANDENBERG
BY Bair, Freeman & Molinare
ATTORNEYS

United States Patent Office 3,389,720
Patented June 25, 1968

3,389,720
NOT VALVE FOR FLUID LOGIC CIRCUITS
Karl A. Brandenberg, Hayward, Calif., assignor to
The Aro Corporation, Bryan, Ohio, a corporation
of Delaware
Filed June 28, 1966, Ser. No. 561,143
6 Claims. (Cl. 137—625.66)

This invention relates to a NOT valve unit for a fluid logic circuit mechanism of the type shown in my copending application, Ser. No. 479,758, filed Aug. 16, 1965.

One object of my present invention is to provide a special type of valve unit designed for controlling fluid logic circuits powered with fluid pressure such as compressed air wherein the valve unit is particularly adapted for mounting on a "circuit board" which, in turn, is adapted to have a plurality of valve units mounted thereon and connected by means of the circuit board for performing various control and/or actuation duties in an assembly complex.

Another object is to provide a valve unit for fluid logic circuits which performs a "NOT" function, the valve comprising a body having a pair of inlets, an outlet and an exhaust to atmosphere, together with an arrangement of operating parts such that one inlet is connected to a supply of fluid pressure, the other inlet constitutes an input adapted to receive a fluid pressure signal and the outlet constitutes a pressure fluid output receiving fluid pressure from the supply in one position of the valve and exhausting the fluid pressure from the output in the other position of the valve.

Still another object is to provide the operating parts so designed as to pressurize the output from the supply if there is no signal fluid pressure in the input (it is discharged). If the input is pressurized with signal fluid pressure, a diaphragm is operated to open the output to exhaust and close off the supply. The output is therefore off or discharged.

A further object is to provide the body of the valve unit with a face adapted to be mounted on a fluid circuit board, the pair of inlets and outlet terminating at this face for fluid connection with the board.

Still a further object is to provide ring seals (such as O-rings) surrounding each of the inlets and the outlet and sealed against the circuit board, thus establishing fluid tight circuits relative thereto.

An additional object is to provide the valve body formed in three parts for ready assembly, one part having a supply valve seat, a central part having an exhaust valve seat opposite the supply valve seat and a diaphragm chamber being provided between the second and third parts opposite the exhaust valve seat so that before the three parts are assembled together a valve disc may be interposed between the supply valve seat and the exhaust valve seat and an actuating diaphragm may be interposed between the second and third parts and operatively connected with the valve disc.

Another additional object is to provide the diaphragm with an actuating stem for the valve disc.

Still another additional object is to provide ring seals between a central part and upper and lower parts of the valve body for a passageway extending from the central part into each of the other parts so that when the three parts are assembled there is no leakage of fluid pressure to atmosphere from the passageway between adjacent faces of the parts.

With these and other objects in view, my invention consists in the construction, arrangement and combination of the various parts of my NOT valve for fluid logic circuits, whereby the objects above contemplated are attained, as hereinafter more fully set forth, pointed out in my claims and illustrated in detail on the accompanying drawing, wherein:

FIG. 1 is a plan view of a NOT valve embodying my invention;
FIG. 2 is a side elevation thereof;
FIG. 3 is a perspective view thereof;
FIG. 4 is an enlarged sectional view through one of my NOT valves showing it mounted on a circuit board adjacent another NOT valve in a manner similar to that disclosed in my copending application above referred to;
FIG. 5 is a fluid circuit diagram of my NOT valve with the parts thereof in one condition of operation, and
FIG. 6 is a fluid circuit diagram thereof with the parts in a different condition of operation.

On the accompanying drawing I have used the reference characters BP to indicate a base plate, G a gasket and CP a cover plate of a circuit board such as disclosed in my copending application, and the numerals 1 and 2 for inlets and 3 for an outlet in FIGS. 4, 5 and 6. The NOT valve herein disclosed is in the form of a unit such as shown in FIGS. 1, 2 and 3 and includes a valve body formed of three parts 10, 12 and 14.

The parts 10, 12 and 14 may be suitably secured together in leak-proof manner by clamping them together by means of screws 16 passing through suitable holes in the parts 12 and 14 and threaded through the part 10, the lower ends of the screws projecting so that the valve units can be mounted on the elements BP, G and CP as shown in FIG. 4 and held in positions by nuts 18. In order to seal fluid circuits between the three valve body parts, O-rings 20 and 22 are provided to seal around passageways 24, 26 and 28 such as shown in FIG. 4 when the heads of the screws 16 are properly tightened down against the part 14 by threading the screws into the part 10.

The valve body part 10 includes the two inlets 1 and 2, and the outlet 3 as illustrated in FIG. 4 and the inlet 1 terminates in an annular supply valve seat 30. The inlet 2 and the passageways 24, 26, 28, lead to a passageway 32 in the part 14 above a diaphragm 34. The valve body part 12 has an exhaust valve seat 36 communicating on one side with the outlet 3 and on the other side with an exhaust passageway 38 which terminates in an exhaust groove 40 in the valve body part 12. A valve stem 42 has a head 44 engaging the diaphragm 34 and extends downwardly from the diaphragm through a bore 46 of the valve part 12. A valve disc 48 is operatively connected with the stem 42 and has resilient facing discs 50 and 52 for coaction at times with the valve seats 30 and 36, respectively. A light spring 54 tends to keep the assembly of discs 48, 50 and 52 and the stem 42 and its head 44 up against the diaphragm 34 as shown in FIG. 4, this being the normal position when there is no input signal to the inlet 2 of the valve unit.

The inlet 1 is adapted for receiving fluid pressure as from a supply pipe 56 and the inlet 2 serves as a signal input adapted to receive fluid pressure from a passageway 58 in the gasket G whereas the outlet 3 serves as an output for fluid pressure supplied from the pipe 56. An outlet pipe is shown at 60 extending from the outlet 3.

The inlets 1 and 2 and the outlet 3 terminate at the lower face of the valve body part 10 so that this face is adapted to be mounted on a fluid circuit board as illustrated (specifically against the upper surface of the base plate BP) and in alignment with certain passageways therein as shown in FIG. 4 which provide for circuit connections within the circuit board. By way of example, the passageway 58 may extend laterally through the gasket G from some other valve unit such as the left hand one shown in FIG. 4 whereas the passageways 1 and 3 may communicate with the pipe connections 56 and 60, or other pressure fluid connections can be made to the inlets and the outlet as desired. By having the inlets 1 and 2 and the outlet 3 terminate at the lower face of the valve body part 10, fluid circuit connections of the type referred to are readily made and sealing can be effectively accomplished by the use of O-rings 62. It is merely necessary to have these O-rings surround the inlets and the outlet and resiliently engage adjacent faces of the base plate BP and the valve body part 10.

The operation of the valve unit disclosed is such that if the input 2 is OFF (discharged) supply pressure from the pipe 56 flows past the open valve seat 30 into the outlet 3 thereby pressurizing whatever device is connected to the pipe 60. At this time the exhaust valve is closed as the disc 52 is in contact with the exhaust valve seat 36. This condition of operation is shown in diagrammatically in FIG. 5.

If the input 2 is ON (pressurized) the diaphragm 34 forces the disc 52 off the seat 36 and the disc 50 onto the seat 30 thereby cutting off the supply from the pipe 56 and permitting any pressure in the pipe 60 to be exhausted past the exhaust valve seat 36 to the exhaust passageway 38 from which it discharges into the groove 40 and finds its way to atmosphere. The output is therefore off (discharged). This condition of operation is shown diagrammatically in FIG. 6.

From the foregoing specification it will be obvious that I have provided a comparatively simple valve unit adaptable for circuit board mounting which performs the NOT function. The valve involves a minimum number of parts, is very simple to assemble and the mounting of the assembly on a circuit board can be acomplished with a minimum of effort.

Some changes may be made in the construction and arangement of the parts of my NOT valve without departing from the real spirit and purpose of my invention, and it is my intention to cover by my claims any modified forms of structure or use of mechanical equivalents which may reasonably be included within their scope.

I claim as my invention:

1. A NOT valve for fluid logic circuits comprising a valve body having a pair of inlets, an outlet and an exhaust passageway, an outlet valve seat for said outlet, an exhaust valve seat for said exhaust passageway, said valve seats being opposed to each other, an outlet valve for coaction with said outlet valve seat, an exhaust valve for coaction with said exhaust valve seat, one of said valves being closed against its seat when the other is spaced from its seat and vice versa, a diaphragm for actuating said valves, said diaphragm being subject to pressure from one of said inlets, the other of said inlets communicating with said outlet when said outlet valve is spaced from said outlet valve seat and cutting off flow between said other of said inlets and said outlet when said outlet valve is seated on said outlet valve seat whereby the absence of a fluid pressure signal to said one of said inlets when fluid pressure is supplied to said other of said inlets will open said outlet valve relative to said outlet valve seat and close said exhaust valve relative to said exhaust valve seat to pressurize said outlet from said other of said inlets.

2. A NOT valve for fluid logic circuits according to claim 1 wherein said valve body has a face adapted to be mounted on a fluid circuit board, said pair of inlets and said outlet terminating at said face.

3. A NOT valve for fluid logic circuits according to claim 2 wherein said valve body has a ring seal surrounding the end of each of said pair of inlets and said outlet adjacent said face, said ring seal being sealed against the adjacent face of said circuit board.

4. A NOT valve for fluid logic circuits according to claim 1 wherein said valve body is formed in three parts, one having said inlets and said outlet and one of said valve seats, one having the other of said valve seats and the third having a passageway from said one of said inlet, to said diaphragm to cause it to open said exhaust valve and close said outlet valve upon said one of said inlets being pressurized.

5. A NOT valve for fluid logic circuits according to claim 4 wherein ring seals are provided between said three parts and include portions which seal passageways extending from one part into another.

6. A NOT valve for fluid logic circuits according to claim 5 wherein said passageway from said one of said inlets to said diaphragm extends through two of said three body parts and into the third one, and additional ring seals are provided for that portion of said passageway extending from one body part into another.

References Cited

UNITED STATES PATENTS

| | | | |
|---|---|---|---|
| 3,107,693 | 10/1963 | Puster et al. | 137—625.66 |
| 3,316,938 | 5/1967 | Fedoseev et al. | 137—625.66 |
| 3,326,239 | 6/1967 | Saint-Joanis et al. | 137—625.66 |

HENRY T. KLINKSIEK, *Primary Examiner.*

ROBERT J. MILLER, *Assistant Examiner.*